US010798564B2

(12) United States Patent
Namiranian

(10) Patent No.: US 10,798,564 B2
(45) Date of Patent: Oct. 6, 2020

(54) MACHINE-READABLE CODE-BASED EMBEDDED SUBSCRIBER IDENTITY MODULE (ESIM) PROFILE DOWNLOAD

(71) Applicant: T-Mobile USA, Inc., Bellevue, WA (US)

(72) Inventor: Babak Namiranian, Bothell, WA (US)

(73) Assignee: T-Mobile USA, Inc, Bellevue, WA (US)

( * ) Notice: Subject to any disclaimer, the term of this patent is extended or adjusted under 35 U.S.C. 154(b) by 0 days.

(21) Appl. No.: 16/565,056

(22) Filed: Sep. 9, 2019

(65) Prior Publication Data

US 2020/0112854 A1   Apr. 9, 2020

Related U.S. Application Data

(60) Provisional application No. 62/742,162, filed on Oct. 5, 2018.

(51) Int. Cl.
*H04W 8/24* (2009.01)
*H04M 1/725* (2006.01)
(Continued)

(52) U.S. Cl.
CPC .......... *H04W 8/245* (2013.01); *G06K 7/1417* (2013.01); *G06Q 30/0267* (2013.01);
(Continued)

(58) Field of Classification Search
CPC ... H04W 8/245; H04W 4/60; H04W 12/0023; H04W 12/06; G06K 7/1417; G06Q 30/0267; H04M 1/72561
(Continued)

(56) References Cited

U.S. PATENT DOCUMENTS 10,356,087 B1 * 7/2019 Vetter .................. H04L 9/0863
10,440,558 B1 * 10/2019 De Figueiredo Junior ................
H04W 12/0027
(Continued)

FOREIGN PATENT DOCUMENTS

EP   3337205 A1   6/2018
FR   3034611 A1   10/2016

OTHER PUBLICATIONS

EP Patent Application No. 19198325.3, Full Novelty Search Report dated Feb. 5, 2020, 16 pages.
(Continued)

*Primary Examiner* — Mong-Thuy T Tran
(74) *Attorney, Agent, or Firm* — Han Santos, PLLC

(57) ABSTRACT

An activation request from a user device that includes a promotion identifier of a promotion campaign is received at a server, in which the promotion identifier is encapsulated by a machine-readable code that further includes a network address of the server. The activation request is routed from the user device to the server via the network address. A determination of whether an embedded Subscriber Identity Module (eSIM) profile associated with the promotion campaign is available for download to the user device is made. When the eSIM profile is available, the eSIM profile is sent to the user device such that the user device is able to use the eSIM profile to access telecommunication services of a Mobile Network Operator (MNO) according to one or more terms of the promotion campaign. When the eSIM profile is unavailable, an indication that the promotion identifier is invalid is sent to the user device.

20 Claims, 7 Drawing Sheets

(51) Int. Cl.
  *H04W 4/60* (2018.01)
  *G06K 7/14* (2006.01)
  *H04W 12/00* (2009.01)
  *G06Q 30/02* (2012.01)
  *H04W 12/06* (2009.01)

(52) U.S. Cl.
  CPC ......... *H04M 1/72561* (2013.01); *H04W 4/60* (2018.02); *H04W 12/0023* (2019.01); *H04W 12/06* (2013.01)

(58) Field of Classification Search
  USPC .......................................................... 455/419
  See application file for complete search history.

(56) References Cited

U.S. PATENT DOCUMENTS

| | | | |
|---|---|---|---|
| 2014/0329502 A1* | 11/2014 | Lee | H04W 12/06 455/411 |
| 2016/0006728 A1 | 1/2016 | Park et al. | |
| 2016/0283216 A1 | 9/2016 | Gao | |
| 2017/0180349 A1* | 6/2017 | Park | H04W 12/06 |
| 2017/0244837 A1* | 8/2017 | Kim | H04M 3/54 |
| 2018/0014178 A1 | 1/2018 | Baek et al. | |
| 2018/0054729 A1* | 2/2018 | Hentschel | H04W 4/60 |
| 2018/0063698 A1 | 3/2018 | Sonntag | |
| 2018/0103370 A1 | 4/2018 | Park et al. | |
| 2018/0109942 A1* | 4/2018 | Lipovkov | H04W 8/183 |
| 2018/0123803 A1* | 5/2018 | Park | H04W 8/205 |
| 2018/0176767 A1 | 6/2018 | Hjelt | |
| 2018/0234837 A1 | 8/2018 | Lee et al. | |
| 2018/0302781 A1* | 10/2018 | Lee | H04W 8/20 |
| 2019/0324735 A1* | 10/2019 | Park | H04W 12/00522 |
| 2019/0380026 A1* | 12/2019 | Lee | H04W 8/26 |
| 2020/0021975 A1* | 1/2020 | Schouler | H04W 12/0027 |
| 2020/0021980 A1* | 1/2020 | Schouler | H04W 12/0023 |

OTHER PUBLICATIONS

EP Patent Application No. 19198325.3, Partial Search Report dated Nov. 5, 2019, 14 pages.

* cited by examiner

US 10,798,564 B2

MACHINE-READABLE CODE-BASED EMBEDDED SUBSCRIBER IDENTITY MODULE (ESIM) PROFILE DOWNLOAD

CROSS-REFERENCE TO RELATED PATENT APPLICATION

This application claims priority to U.S. Provisional Patent Application No. 62/742,162, filed on Oct. 5, 2018, entitled "Profile Download Improvement," which is hereby incorporated by reference in its entirety.

BACKGROUND

The use of embedded Universal Integrated Circuit Cards (eUICCs), also referred to as embedded Subscriber Identity Modules (eSIMs), are becoming increasingly prevalent in consumer and machine-to-machine (M2M) devices. Consumer devices are network-capable devices that are generally marketed to individual consumers. For example, these devices may include a smartphone, a tablet computer, a smartwatch, a gaming console, and/or so forth. Unlike a traditional UICC or SIM card that exists as a removable smart card that is transferable between multiple devices, an eUICC is an integrated circuit that is not designed to be user-removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a wireless communication carrier, also referred to as a mobile network operator (MNO). Other data that are stored in the eSIM profile may include carrier network information, security authentication information, a list of accessible network services, and/or so forth. A wireless communication carrier may use a subscription management service to transfer an eSIM profile to the eUICC via an over-the-air (OTA) update. For example, the subscription management service may be a Remote SIM provisioning (RSP) platform that is operated by a third-party for the wireless communication carrier. In this way, a new subscriber with a user device that is equipped with an eUICC may sign up and receive telecommunication services from the wireless communication carrier without having to obtain a physical SIM card from the wireless communication carrier.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
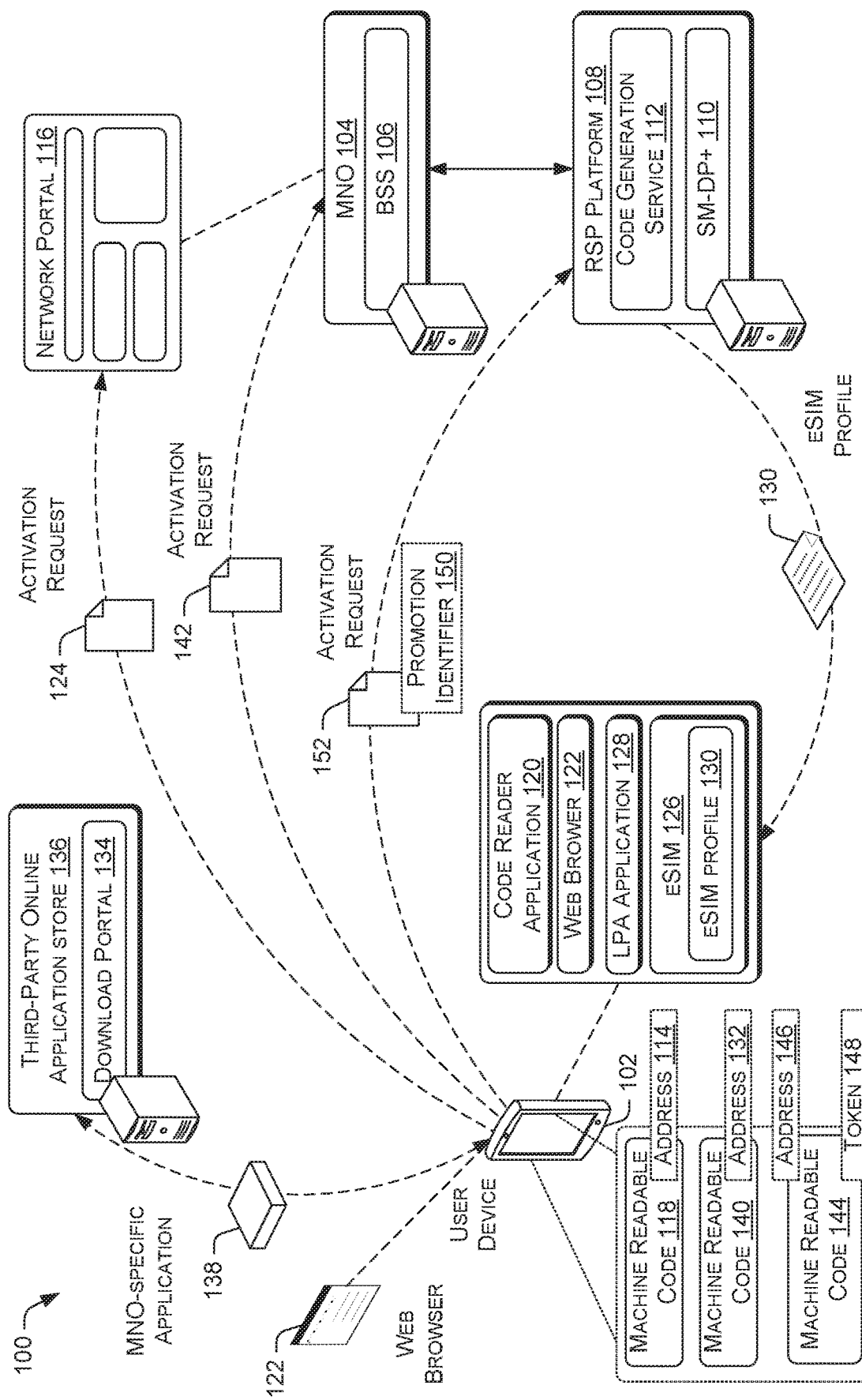
FIG. 1 illustrates an example architecture that enables the use of a machine-readable code to activate the download of an eSIM profile to a user device.

This disclosure is directed to techniques that enable the use of a machine-readable code to activate the download of an eSIM profile to a user device. In some embodiments, a user device may receive a machine-readable code. The machine-readable code may be inputted into the user device when a code reader application on the user device is used by a user to scan the machine-readable code with an image sensor (e.g., a camera) of the user device. For example, the machine-readable code may be a Quick Response (QR) code. The machine-readable code may specify the network address of a mobile network operator (MNO) network portal. In various instances, the network address may be a universal resource locator (URL), an Internet Protocol (IP) address, or some other network location identifier. The MNO network portal may be hosted by a business support system (BSS) of the MNO. The code reader application may automatically direct a web browser of the user device to navigate to the MNO network portal based on the machine-readable code. The MNO network portal may provide instructions that direct the user to select and activate a subscription plan for the user device, as well as download an eSIM profile onto the user device. Accordingly, the user of the user device may use the MNO network portal to select and activate the subscription plan for the telecommunication services provided by the MNO. In turn, the BSS of the MNO may activate the subscription plan for the user device and request that an SM-DP+ of an RSP platform assign an eSIM profile to the user device. Further, the user may initiate a download of the eSIM profile to the user device via a local provisioning agent (LPA) application of the user device according to the instructions provided by the MNO network portal. In response, the SM-DP+ of the RSP platform may provision the user device with the assigned eSIM profile.

In other embodiments, a machine-readable code received by the user device may specify a network address of a download portal for an MNO-specific application. The download portal may be provided by a third-party online application store for a user of the user device to download the MNO-specific application. The MNO-specific application may be an application that is uploaded to the third-party online application store by the MNO. The MNO-specific application is configured to provide users with access to features and functionalities related to the telecommunication services of the MNO. Following the download and installation of the MNO-specific application on the user device, the MNO-specific application may prompt the user with instructions to select and activate a subscription plan for the telecommunication services provided by the MNO, as well as download an eSIM profile onto the user device. Once the user has selected and activated a subscription plan, the MNO-specific application may send an activation request to a BSS of the MNO. In turn, the BSS of the MNO may activate the subscription plan for the user device and request that an SM-DP+ of an RSP platform assign an eSIM profile to the user device. Further, the user may initiate a download of the eSIM profile to the user device via an LPA application of the user device or the MNO-specific application according to the instructions provided by the MNO-specific application. In response, the SM-DP+ of the RSP platform may provision the user device with the assigned eSIM profile.

In additional embodiments, a machine-readable code received by the user device may specify a network address for an SM-DP+ of an RSP platform that manages eSIM profiles for the MNO. The machine-readable code may further specify a promotion identifier of a promotion campaign. In various instances, the user device may receive the machine-readable code via a code reader application that scans the code via an image sensor of the user device. In turn, the code reader application of the user device may navigate to the network address of the SM-DP+ and provide the promotion identifier to the SM-DP+. Subsequently, the SM-DP+ may determine whether an eSIM profile associated with a promotion campaign corresponding to the promotion identifier is available. For example, the promotion campaign may be established with a limited number of eSIM profiles and/or for a limited time duration. Accordingly, if the SM-DP+ determines that an associated eSIM profile is available, the SM-DP+ may provision the user device with the eSIM profile. Otherwise, the SM-DP+ may notify the user device that the promotion identifier is invalid.

In alternative embodiments, the SM-DP+ may query a BSS of the MNO to determine whether the eSIM profile associated with a promotion campaign is available. In turn, the BSS of the MNO may make the determination and provide a response to the SM-DP+. Accordingly, if the response is that the associated eSIM profile is available, the SM-DP+ may provision the user device with the eSIM profile. Otherwise, the SM-DP+ may notify the user device that the promotion identifier is invalid.

The use of the machine-readable code to provision a user device with an eSIM profile in accordance with the various embodiments herein may provide multiple advantages over other eSIM profile provisioning techniques. For example, in one instance, a network address for a default SM-DP+ may be hard encoded in the eUICC of a user device by a device manufacturer for a particular MNO. In such an instance, an LPA application on the user device may use the network address to contact the default SM-DP+ and obtain an eSIM profile. However, since the default SM-DP+ is tied to the particular MNO, the SM-DP+ may be unable to provision the user device with an appropriate eSIM profile when the user desires to switch to using the user device with a different MNO.

In another instance, a user device may be configured to contact a Subscription Manager Discover Server (SM-DS) of an RSP platform during device boot up with a query for an eSIM profile or an updated eSIM profile. The query may include an eUICC ID (EID) that identifies the eUICC installed in the user device. The SM-DS may be preconfigured with a lookup table that correlates EIDs to corresponding responsible SM-DP+s. In this way, the SM-DS is able to route the query from the user device to an appropriate SM-DP+ that is able to provide an eSIM profile to the user device. However, the use of the SM-DS in such a manner by the wireless telecommunication is currently still on a trial basis, and issues regarding which party is responsible for implementation cost and the viability of long-term adoption are still unclear.

In an additional instance, a user may request an eSIM profile for a user device using an LPA application on the user device. In such an instance, the user is instructed to initially locate and open the LPA application, so that the user is able to select an option to add an eSIM profile for an MNO to the user device. In turn, the LPA application prompts the user to scan a machine-readable code that corresponds to the eSIM profile. The machine-readable code is generally pre-printed on paper that is distributed to the user. Once the machine-readable code is inputted, the LPA application is able to use the information contained in the code to contact a responsible SM-DP+ for an eSIM profile. However, these manual steps for interfacing with the LPA application without clear guidance may be difficult for an inexperienced user. This may result in lost opportunities due to potential new subscribers abandoning the eSIM profile provisioning process before completion. Furthermore, the use of LPA applications to scan machine-readable codes means the MNO must order pre-printed copies of machine-readable codes that correspond to new eSIM profiles for distribution to users. However, a certain amount of these pre-printed machine-readable codes may become lost or misplaced during the distribution process. This may result in waste as the MNO is generally unable to distribute the new eSIM profiles that correspond to compromised machine-readable codes. Further, in some scenarios, an MNO may use SM-DP+s of different RSP platforms to provision eSIM profiles to user devices. This can create inventory and logistical issues for the distribution of the machine-readable codes as the MNO may run out of machine-readable codes associated with one SM-DP+, while at the same time have an excessive inventory of machine-readable codes associated with another SM-DP+. The techniques described herein may be implemented in a number of ways and are designed to overcome these issues. Example implementations are provided below with reference to the following FIGS. 1-7.

Example Architecture

FIG. 1 illustrates an example architecture that enables the use of a machine-readable code to activate the download an eSIM profile to a user device. A user device 102 may be provided with an eSIM profile so that the user device 102 is able to use telecommunication services provided by a Mobile Network Operator (MNO), such as the MNO 104. In various embodiments, the MNO 104 may provide wireless communication between multiple user devices. Further, the MNO 104 may also provide communications between the multiple user devices and user devices that are serviced by other telecommunications networks. The telecommunication services provided by the MNO 104 may include voice communication, multimedia communication, data communication, such as email, messaging, content streaming, content uploading, and/or so forth.

A wireless carrier network operated by the MNO 104 may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the wireless carrier network may include one or more RANs and a regional circuit and/or packet-switched network and associated signaling network facilities. The MNO 104 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless carrier network may be accessed via wired or wireless local area networks (LANs). For example, a wireless local area network may be a network that is established using Wi-Fi or Bluetooth standards and hardware.

A RAN of the wireless carrier network may include a number of base stations, also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network of the wireless carrier network. The core network may connect to a public packet data communication network, such as the Internet. The data and voice communications via the RANs, the core network, and the Internet may support a variety of telecommunication services through the wireless carrier network. The core network may further include one or more backend servers that provide backend services. The backend services may include business support systems (BSS) 106 and/or operation support systems (OSS) of the wireless carrier network. For example, the services provided by the BSS 106 may include product management, order management, revenue management, and customer management.

In various embodiments, 2G and/or 3G network components of the wireless carrier network may include a serving GPRS support node (SGSN) that routes voice calls to and from the public switched telephone network (PSTN), a Gateway GPRS Support Node (GGSN) that handles the routing of data communication between external packet-switched networks and the core network. The network components may further include a Packet Data Network (PDN) gateway (PGW) that routes data traffic between the GGSN and the Internet. The LTE components of the wireless carrier network may include an Evolved Packet Core (EPC) and an IP Multimedia Subsystem (IMS) core.

The wireless carrier network may provide telecommunication services to multiple user devices, which may include consumer devices and M2M devices. Consumer devices are network-capable devices that are generally marketed to individual consumers, which are capable of obtaining telecommunication and/or data communication services from the wireless carrier network. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, also referred to as an eSIM, that is directly wired or soldered to a circuit board of the user device. The eUICC may store one or more eSIM profiles. Each eSIM profile may include information for accessing the telecommunication services (e.g., voice calling service, data service, etc.) provided by a corresponding MNO, such as the MNO 104. Each user device may be further equipped with a modem that enables the user device to perform telecommunication and data communication with the wireless carrier network. Accordingly, the modem may encode digital information for transmission in uplink radio signals to the wireless carrier network, as well as decode digital information that is received from the wireless carrier network via downlink radio signals. In various embodiments, the user device 102 may be a consumer device. The user device 102 may communicate with the backend services of the MNO 104 via the wireless carrier network, a local area network (LAN), a wide area network (WAN), and/or a collection of networks, such as the Internet.

The MNO 104 may use one or more RSP platforms, such as the RSP platform 108, to distribute the eSIM profiles to user devices. In various embodiments, the RSP platform 108 may include computing devices (e.g., servers) that implement at least one Subscription Manager Data Preparation (SM-DP), at least one Subscription Manager Data Preparation Plus (SM-DP+), such as the SM-DP+ 110, and at least one Subscription Manager Secure Routing (SM-SR). In various embodiments, the eSIM profiles for consumer user devices, such as the user device 102, may be initially loaded into profile state stores of the SM-DP+ 110. In some instances, each profile data store of the SM-DP+ 110 may hold eSIM profiles of a single MNO. In other instance, a single profile data store of an SM-DP+ 110 may hold eSIM profiles of multiple different MNOs. The SM-DP+ 110 may distribute eSIM profiles to the consumer user devices. In various embodiments, the SM-DP+ 110 may interface with an LPA application on a user device to distribute an eSIM profile to the user device. For example, the LPA application and the SM-DP+ 110 may perform mutual authentication to establish communication between the LPA application and the SM-DP+ 110 for eSIM profile download. Subsequently, the SM-DP+ 110 may send the eSIM profile to the LPA application via an over-the-air (OTA) update. The LPA application then stores the eSIM profile in the eSIM of the user device.

In various embodiments, the RSP platform 108 may include a code generation service 112 that generates and distributes different types of machine-readable codes. In some embodiments, each of the machine-readable codes may be a Quick Response (QR) code. In other embodiments, the machine-readable code may be an Aztec code, a Maxi-Code, or another type of machine-readable matrix code. The RSP platform 108 may electronically transmit the machine-readable codes to a backend service of the MNO 104. In turn, human operators of the MNO 104 may use the backend service to distribute the machine-readable codes to distribution endpoints that interface with users. For example, the distribution endpoints may include a retail storefront of the MNO 104 that prints out the machine-readable codes or provides pre-printed versions of the machine-readable code for dissemination to new or existing subscribers. In another example, the distribution endpoints may include a publishing company that publishes one or more of the machine-readable codes in a publication. In an additional example, that distribution endpoint may be an online portal of the MNO 104 that enables new or existing subscribers to electronically download the machine-readable codes.

In a first scenario, a first type of machine-readable code generated by the RSP platform 108 may encapsulate a network address 114 of an MNO network portal 116 that is operated by MNO 104. The MNO network portal 116 may be operated by the MNO 104 and provides access to functionalities of the BSS 106. The network address 114 of the MNO network portal 116 may be an URL, an IP address, or some other network location identifier of the MNO network portal 116. The MNO network portal 116 may include a website and/or one or more webpages that are accessible via the network address.

In such a scenario, the user device 102 may receive the input of a machine-readable code 118 that includes the network address 114 of the MNO network portal 116. The machine-readable code 118 may be inputted when a user of the user device 102 uses a code reader application 120 on the user device 102 to scan the machine-readable code 118 with an image sensor (e.g., a camera) of the user device. In turn, the code reader application 120 may direct a web browser 122 on the user device 102 to navigate to the MNO network portal 116.

The MNO network portal 116 may provide instructions that guide the user in interfacing with the BSS 106 to set up a telecommunication services subscription plan, as well as download an eSIM profile. For example, the user may use one or more web pages of the MNO network portal 116 to set up a subscriber account, select a particular subscription plan for the user device 102, customize a subscription duration for the subscription plan, sign up for optional features or offers associated with the subscription plan, configure payment options for the subscription plan, activate the subscription plan, and/or so forth. In instances in which the user is a current subscriber of the MNO 104, the MNO network portal 116 may prompt the user to enter existing subscriber authentication credentials to login into an existing subscriber account rather than set up a new subscriber account. Once the input of information is complete, the MNO network portal 116 may send the subscription plan activation information in an activation request 124 to the BSS 106.

In turn, the BSS 106 may activate the subscription plan for the user device and request that the SM-DP+ 110 of the RSP platform 108 assign an eSIM profile to the user device. Following the assignment of the eSIM profile to the user device, the SM-DP+ of the RSP platform 108 may return a unique token that identifies the assigned eSIM profile to the BSS 106. For example, the unique token may be an Integrated Circuit Card Identifier (ICCID) of the assigned eSIM profile or some other unique identifier.

The MNO network portal 116 may further present instructions that guide the user to download an eSIM profile to an eSIM 126 of the user device 102. The MNO network portal 116 may prompt the user to open an LPA application 128 on the user device 102. In some instances, the MNO network portal 116 may display a network address of the SM-DP+ 110 and a unique token that identifies the eSIM profile assigned to the user device 102. The network address of the SM-DP+ 110 may be an URL, an IP address, or some other network location identifier of the SM-DP+ 110. The instructions may direct the user to input the network address of the SM-DP+ 110 and the unique token into an interface of the LPA application 128, and then trigger the LPA application 128 to request the assigned eSIM profile from the SM-DP+ 110. In response, the SM-DP+ 110 may send the eSIM profile 130 to the LPA application 128 for storage in the eSIM 126 of the user device 102. In other instances, the MNO network portal 116 may instead display a machine-readable code that encapsulates the network address and the unique token. The user is further instructed by the MNO network portal 116 to scan the machine-readable code using the LPA application 128 and then trigger the LPA application 128 to request the assigned eSIM profile.

In a second scenario, a second type of machine-readable code generated by the RSP platform 108 may encapsulate a network address 132 of a download portal 134 that is hosted by a third-party online application store 136. The download portal 134 may be configured to enable the download of an application that is specific to the MNO 104, i.e., the MNO-specific application 138. In various embodiments, the MNO-specific application 138 may be an application that is uploaded to the third-party online application store 136 by the MNO 104. The MNO-specific application 138 is configured to provide users with access to features and functionalities related to the telecommunication services of the MNO 104. The network address of the download portal 134 may be an URL, an IP address, or some other network location identifier of the MNO network portal 116. The download portal 134 may include a website and/or one or more webpages that are accessible via the network address for the download of the MNO-specific application 138.

In such a scenario, the user device 102 may receive the input of a machine-readable code 140 that includes the network address 132 of the download portal 134. The machine-readable code 118 may be inputted when a user of the user device 102 uses a code reader application 120 on the user device 102 to scan the machine-readable code 118 with an image sensor (e.g., a camera) of the user device. In turn, the code reader application 120 may direct a web browser 122 on the user device 102 to navigate to the download portal 134.

The download portal 134 may enable the user to download and install the MNO-specific application 138 on the user device 102. Subsequently, the MNO-specific application 138 may provide instructions that guide the user in interfacing with the MNO-specific application 138 to set up a telecommunication services subscription plan. For example, the user may use one or more interface screens of the MNO-specific application 138 to set up a subscriber account, select a particular subscription plan for the user device 102, customize a subscription duration for the subscription plan, sign up for optional features or offers associated with the subscription plan, configure payment options for the subscription plan, activate the subscription plan, and/or so forth. In instances in which the user is a current subscriber of the MNO 104, the MNO-specific application 138 may prompt the user to enter existing subscriber authentication credentials to login into an existing subscriber account rather than set up a new subscriber account. Once the activation process is complete, the MNO-specific application 138 may send the subscription plan activation information in an activation request 142 to the BSS 106. In turn, the BSS 106 may activate the subscription plan for the user device and request that the SM-DP+ 110 of the RSP platform 108 assign an eSIM profile to the user device. Following the assignment of the eSIM profile to the user device, the SM-DP+ 110 of the RSP platform 108 may return a unique token that identifies the assigned eSIM profile to the BSS 106. In turn, the BSS 106 may transmit a network address of the SM-DP+ 110 and the unique token to the MNO-specific application 138.

The MNO-specific application 138 may further present instructions that guide the user to download an eSIM profile to the eSIM 126 of the user device 102. In some instances, the MNO-specific application 138 may display the network address of the SM-DP+ 110 and the unique token, and instructions for the user to open the LPA application 128 on the user device 102. The instructions may include information that is pre-stored in the MNO-specific application and/or information that is provided by the BSS 106 along with the network address of the SM-DP+ 110 and the unique token. The instructions may further direct the user to input the network address of the SM-DP+ 110 and the unique token into an interface of the LPA application 128, and then trigger the LPA application 128 to request the assigned eSIM profile from the SM-DP+ 110. In response, the SM-DP+ 110 may send the eSIM profile 130 to the LPA application 128 for storage in the eSIM 126 of the user device 102.

In other instances, the MNO-specific application 138 may automatically interface with the LPA application 128 to pass the network address of the SM-DP+ 110 and the unique token of the assigned eSIM profile to the LPA application 128. This may be performed by the MNO-specific application 138 in lieu of guiding the user to download the eSIM. Subsequently, the LPA application 128 may direct the LPA application 128 to request the assigned eSIM profile from the SM-DP+ 110. In response, the SM-DP+ 110 may send the eSIM profile 130 to the LPA application 128 for storage in the eSIM 126 of the user device 102. In various embodiments, the MNO-specific application 138 may interface with the LPA application 128 by calling one or more application program interfaces (APIs) of the LPA application 128.

In a third scenario, a third type of machine-readable code generated by the RSP platform 108 may encapsulate an activation code (AC) that includes a network address of an SM-DP+ and a unique token that specifies a promotion identifier of a promotion campaign. In such a scenario, a machine-readable code 144 may encapsulate the network address 146 of the SM-DP+ 110 and a unique token 148 that includes a promotion identifier 150. In at least one embodiment, the activation code may have the following format: "'1'|'$'|SM-DP+ Address|'$'|AC Token", in which "1" is a leading value, "$" is a delimiter and "AC Token" is the promotion identifier in hexadecimal format.

The machine-readable code 144 may be inputted when a user of the user device 102 uses a code reader application 120 on the user device 102 to scan the machine-readable code 144 with an image sensor (e.g., a camera) of the user device. In turn, the code reader application 120 may direct a web browser 122 on the user device 102 to submit an activation request 152 that includes the unique token 148 to the SM-DP+ 110 specified by the network address 146. At this point, the SM-DP+ 110 and the LPA application 128 of the user device 102 may perform a mutual authentication procedure to establish communication for eSIM profile download. In some embodiments, the SM-DP+ 110 may initiate the mutual authentication procedure with the LPA application 128 to establish communication between the SM-DP+ 110 and the LPA application 128. Alternatively, the SM-DP+ 110 may provide instructions for presentation via the web browser 122 to the user, in which the instructions prompt the user to activate the LPA application 128 to initiate the mutual authentication procedure with the SM-DP+ 110.

Subsequently, the SM-DP+ 110 may determine whether an eSIM profile associated with the promotion campaign as identified by the promotion identifier 150 is available. In various embodiments, the promotion campaign may be configured to promote a particular subscription plan offered by the MNO 104. For example, the particular subscription plan may be a trial subscription plan, a prepaid subscription plan, or a postpaid subscription plan. The promotion campaign may be configured with one or more eligibility criteria. For example, the promotion campaign may be a limited quantity campaign in which only a limited number of offers are available. Accordingly, the promotion campaign may be established with a limited number of eSIM profiles that are available on a first come, first served basis. Alternatively, or concurrently, the promotion campaign may be established for a limited time duration, i.e., with an expiration date. In some embodiments, the one or more eligibility criteria may include one or more subscriber requirements. For example, the promotion campaign may be available only for a new subscriber, a prepaid subscriber, a postpaid subscriber, a subscriber with a non-delinquent account, specific make and/or model of the user device to be activated for the subscriber, and/or so forth.

Thus, the SM-DP+ 110 may determine whether the activation request meets the one or more eligibility criteria of the promotion campaign. The SM-DP+ 110 may determine that an eSIM profile is available for the user device 102 when the one or more eligibility criteria are met. In some embodiments, the SM-DP+ may generate a web interface page for display by the web browser 122. The web interface page may request that the user provide a user device identifier, such as an International Mobile Subscriber Identity (IMSI), an International Mobile Equipment Identifier (IMEI), or some other identifier. The user device identifier is then used by the SM-DP+ 110 to verify that the one or more subscriber requirements are met. For example, the SM-DP+ 110 may contact the BSS 106 of the MNO 104 and use the user device identifier to obtain one or more subscriber details for comparison against the one or more subscriber requirements. Following a determination that the one or more eligibility requirements of the promotion campaign are met, the SM-DP+ 110 may provision the user device with a next available eSIM profile from a pool of available eSIM profiles reserved for the promotion campaign. For example, the SM-DP+ 110 may send the eSIM profile 130 to the LPA application 128 for storage in the eSIM 126 of the user device 102. Otherwise, the SM-DP+ may notify the user device 102 that the promotion identifier is invalid.

In this way, copies of the machine-readable code 144 that include the promotion identifier may be scanned by multiple user devices and/or multiple times so that eSIM profiles from the pool of available eSIM profiles for the corresponding promotion campaign may be downloaded to the multiple user devices.

In alternative embodiments, the SM-DP+ 110 may query a BSS 106 of the MNO 104 to determine whether the eSIM profile associated with a promotion campaign is available. In such embodiments, the BSS 106 may determine whether the activation request meets the one or more eligibility criteria of the promotion campaign. Following the determination, the BSS 106 of the MNO 104 may provide a response to the SM-DP+ 110. Accordingly, if the response is that the eSIM profile is available, the SM-DP+ 110 may provision the user device with a next available eSIM profile from a pool of ESIM profiles reserved for the promotion campaign. Otherwise, the SM-DP+ 110 may notify the user device that the promotion identifier is invalid.

Example Computing Device Components

Figure 2:
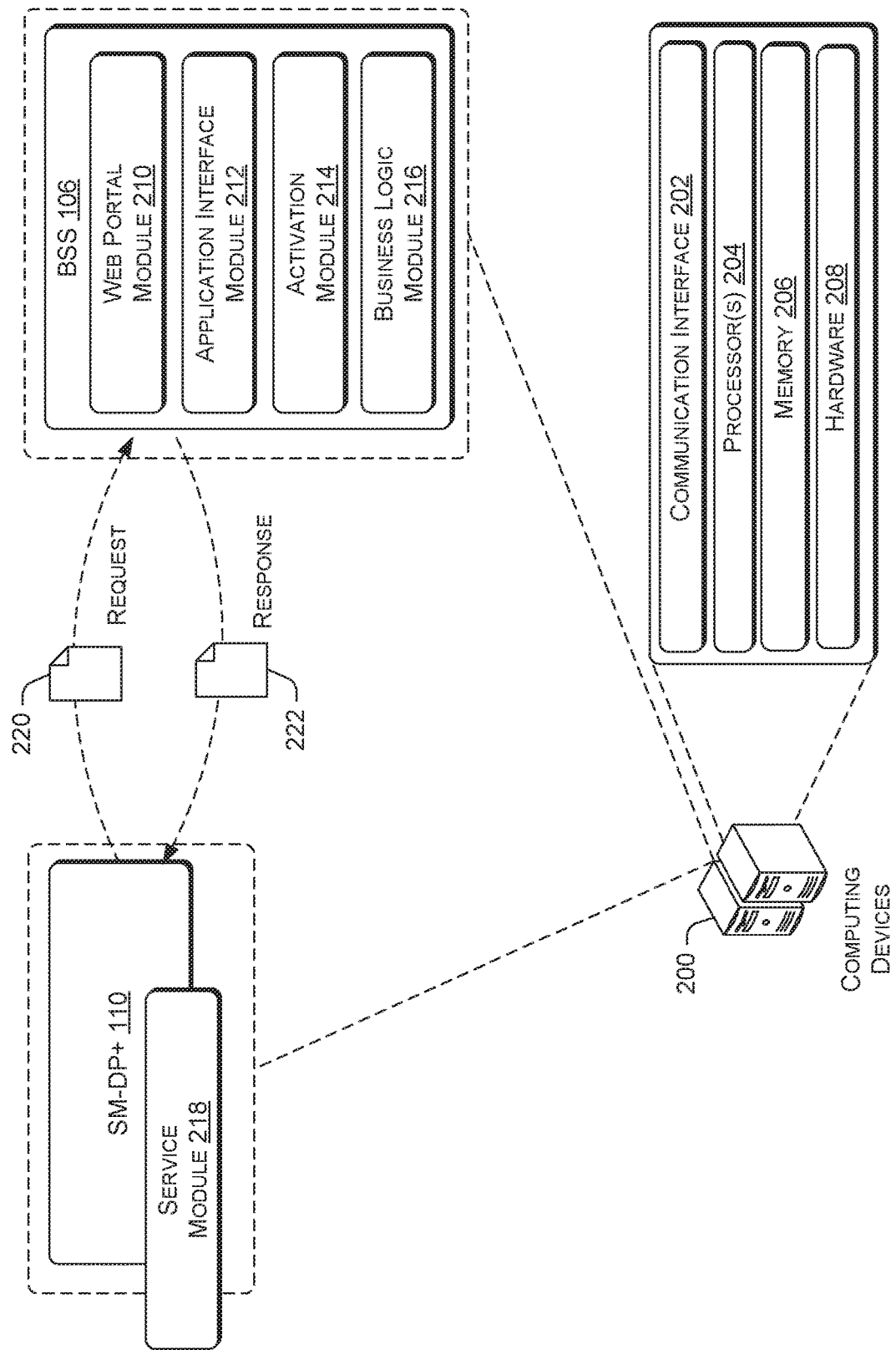
FIG. 2 is a block diagram showing various components of one or more illustrative computing devices that support the use of a machine-readable code to activate the download of an eSIM profile to a user device.

FIG. 2 is a block diagram showing various components of one or more illustrative computing devices that support the use of a machine-readable code to activate the download of an eSIM profile to a user device. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud.

The computing devices 200 may implement various back-end services of the MNO 104 and the RSP platform 108, such as the BSS 106 and the SM-DP+ 110. The implementation involves the execution of software, applications, and/or modules that include routines, program instructions, code segments, objects, and/or data structures that perform particular tasks or implement particular abstract data types. Although the BSS 106 and the SM-DP+ 110 are illustrated as being executed by a common set of computing devices 200, the BSS 106 and the SM-DP+ 110 may be executed by different sets of computing devices in various embodiments.

The BSS 106 may include a web portal module 210, an application interface module 212, an activation module 214, and a business logic module 216. The SM-DP+ 110 may include a service module 218. The web portal module 210 may provide the MNO network portal 116 to the user device 102. In various embodiments, the web portal module 210 may use a web page server to serve the one or more web pages of the MNO network portal 116 to the user device 102. The web pages may provide instructions and enable the user to input subscription plan information and eSIM profile provisioning information for a user device. The application interface module 212 may interact with an MNO-specific application, such as the MNO-specific application 138. The application interface module 212 may receive subscription plan activation information from the MNO-specific application. In turn, the application interface module 212 may send a network address of an SM-DP+ and a unique token of an assigned eSIM profile to the MNO-specific application.

The activation module 214 may activate a subscription plan to the telecommunication services provided by the MNO 104 based on the subscription plan activation information received from a user device. For example, the subscription plan may be a trial subscription plan, a prepaid subscription plan, or a postpaid subscription plan. Along with the activation of the subscription plan for the user device, the activation module 214 may also prompt the SM-DP+ 110 to assign an eSIM profile to the user device. In one instance, a trial subscription plan only allows the use of the telecommunication services of the MNO 104 for a limited time period, and access to the telecommunication services via the assigned eSIM profile is set to expire at the end of the limited time period.

The business logic module 216 may determine whether an activation request for obtaining an eSIM profile related to a promotion campaign for a user device meets one or more eligibility criteria of the promotion campaign. In various embodiments, such a determination may be made by the business logic module 216 following an establishment of communication between the SM-DP+ 110 and the LPA application 128 of the user device 102. The business logic module 216 may reject the activation request for various reasons. For example, the activation request may be rejected when there are no more eSIM profiles associated with the promotion campaign available for distribution. In another example, the activation request may be rejected when the activation request is received after the expiration of the promotion campaign. In an additional example, the activation request may be rejected when a user associated with the user device of the eSIM profile fails to meet any of the one or more subscriber requirements.

In some embodiments, the business logic module 216 may receive an activation request 220 from a service module 218 of the SM-DP+ 110. In return, the business logic module 216 may send the results of the eligibility determinations in a response 222 to the service module 218. For example, if the user device 102 making the activation request is eligible for an eSIM profile associated with a promotion campaign, the business logic module 216 may notify the service module 218 that an eSIM profile is available for the user device 102. The business logic module 216 may also direct the activation module 214 to activate a corresponding subscription plan of the promotion campaign for the user device 102. However, if the user device 102 making the activation request is ineligible for an eSIM profile, the business logic module 216 may notify the service module 218 that no eSIM profile is available for the user device 102.

Accordingly, if a response is that the eSIM profile is available, the service module 218 may direct the SM-DP+ 110 to provision the user device 102 with a next available eSIM profile related to the promotion campaign in response to a request from an LPA application on the user device. Otherwise, the service module 218 may send a notification to the LPA application 128 of the user device 102 indicating that the promotion identifier is invalid in response to the activation request 220 from the LPA application 128. The use of the business logic module 216 of the BSS 106 to make eligibility determinations may enable the MNO 104 to quickly and efficiently modify the one or more eligibility criteria that are implemented by the business logic module 216.

In other embodiments, the service module 218 of the SM-DP+ 110 may be configured to use its own business logic to independently perform the eligibility determination for whether an activation request for obtaining an eSIM profile related to a promotion campaign for a user device meets one or more eligibility criteria of the promotion campaign. The service module 218 may perform the determination in a similar manner as the business logic module 216 after the SM-DP+ 110 has mutually authenticated with the LPA application of the user device for eSIM profile download. Accordingly, if the user device 102 making the activation request is eligible for an eSIM profile associated with a promotion campaign, the service module 218 may direct the SM-DP+ 110 to provision the user device 102 with a next available eSIM profile from a pool of eSIM profiles reserved for the promotion campaign. The service module 218 may also notify the activation module 214 of the BSS 106 to activate a corresponding subscription plan of the promotion campaign for the user device. However, if the user device 102 making the activation request is ineligible for an eSIM profile associated with a promotion campaign, the service module 218 may send a notification to the LPA application 128 of the user device 102 indicating that the promotion identifier is invalid. These embodiments have the benefit of eliminating communication overhead between the SM-DP+ and the BSS 106 for the purpose of verifying promotion campaign eligibility.

Example User Device

Figure 3:
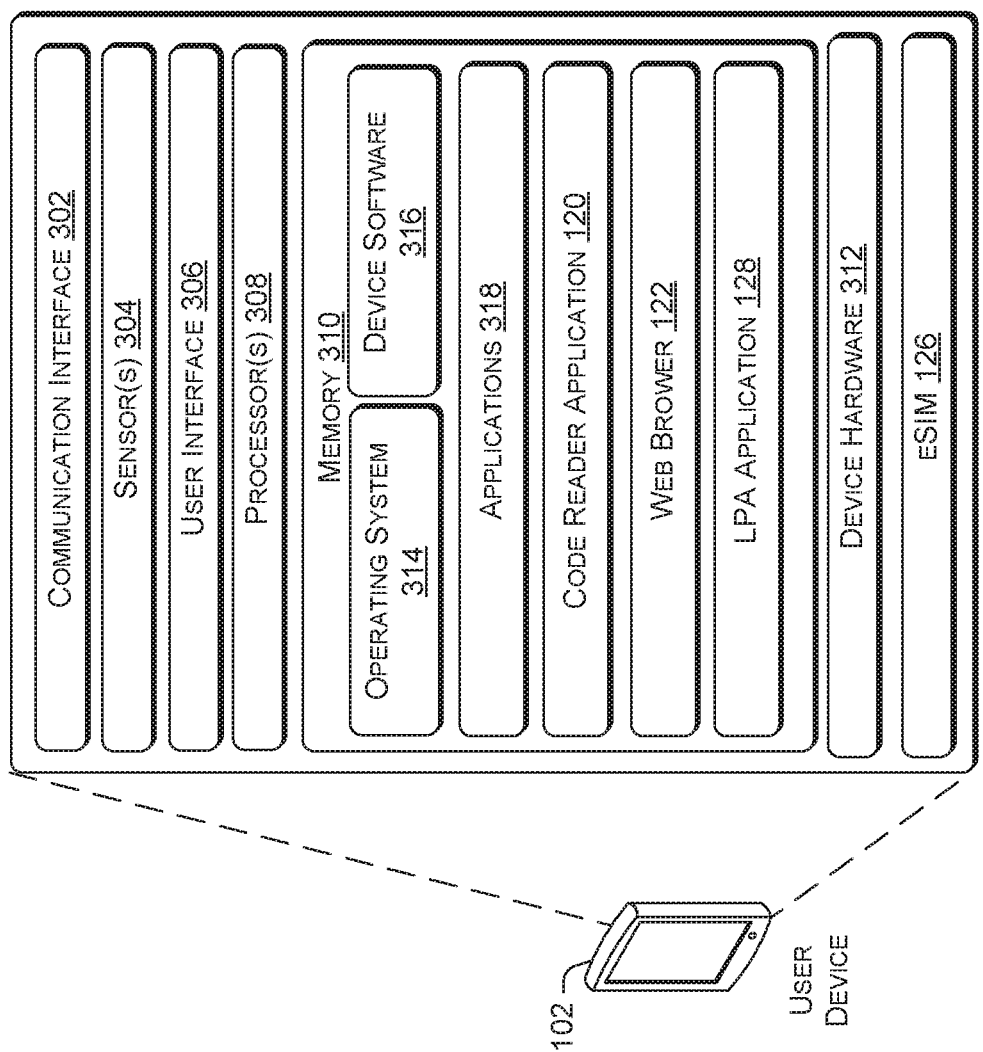
FIG. 3 is a block diagram showing various components of an illustrative user device that uses a machine-readable code to activate the download of an eSIM profile to the user device.

FIG. 3 is a block diagram showing various components of an illustrative user device that uses a machine-readable code to activate the download of an eSIM profile to the user device. The user device 102 may include a communication interface 302, one or more sensors 304, a user interface 306, one or more processors 308, memory 310, and device hardware 312. The communication interface 302 may include wireless and/or wired communication components that enable the electronic device to transmit or receive voice or data communication via the wireless carrier network, as well as other telecommunication and/or data communication networks. The sensors 304 may include a proximity sensor, a compass, an accelerometer, biometric sensors, image sensors (e.g., cameras), and/or a global positioning system (GPS) sensor, among other appropriate sensors. The proximity sensor may detect the movement of objects that are proximate to the user device 102. The compass, the accelerometer, and the GPS sensor may detect orientation, movement, and geolocation of the user device 102.

The user interface 306 may enable a user to provide input and receive output from the user device 102. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 312 may include a cellular modem that enables the user device 102 to perform telecommunication and data communication with one or more wireless carrier networks, as well as a short-range transceiver that enables the device to connect to other devices via short-range wireless communication links. The device hardware 312 may further include signal converters, antennas, hardware decoders and encoders, graphics processors, and/or the like that enable the user device 102 to execute applications and provide telecommunication and data communication functions. The cellular modem may be driven by modem software to perform telecommunication and data communication with a wireless communication network. The modem software may be firmware that is stored in dedicated non-volatile memory of the user device 102. Such non-volatile memory may include read-only memory (ROM), erasable programmable read-only memory (EPROM), or flash memory. The user device is further equipped with the eSIM 110 that stores one or more eSIM profiles.

The one or more processors 308 and the memory 310 of the user device 102 may implement an operating system 314, device software 316, and one or more applications 318. Such software may include routines, program instructions, objects, and/or data structures that are executed by the processors 308 to perform particular tasks or implement particular abstract data types.

The operating system 314 may include components that enable the user device 102 to receive and transmit data via various interfaces (e.g., user controls, communication interface 302, and/or memory input/output devices). The operating system 314 may also process data using the one or more processors 308 to generate output based on input that are received via the user interface 306. For example, the operating system 314 may provide an execution environment for the execution of the applications 318. The operating system 314 may include a presentation component that presents the output (e.g., display the data on an electronic display, store the data in memory, transmit the data to another electronic device, etc.).

The operating system 314 may include an interface layer that enables applications to interface with the modem and/or the communication interface 302. The interface layer may comprise public APIs, private APIs, or a combination of both public APIs and private APIs. Additionally, the operating system 314 may include other components that perform various other functions generally associated with an operating system. The device software 316 may include software components that enable the user device to perform functions. For example, the device software 316 may include basic input/output system (BIOS), bootrom, or a bootloader that boots up the user device 102 and executes the operating system 314 following power-up of the device.

The applications 318 may include applications that provide utility, entertainment, and/or productivity functionalities to a user of the user device 102. For example, the applications 318 may include telephony applications, electronic mail applications, remote desktop applications, web browser applications, navigation applications, office productivity applications, multimedia streaming applications, an online shopping application, and/or so forth. The one or more processors 308 and the memory 310 of the user device 102 may further implement the code reader application 120, the web browser 122, and the LPA application 128.

Example Processes

FIGS. 4-7 present illustrative processes 400-700 that enable the use of a machine-readable code to activate the download of an eSIM profile to a user device. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the architecture 100 of FIG. 1.

Figure 4:
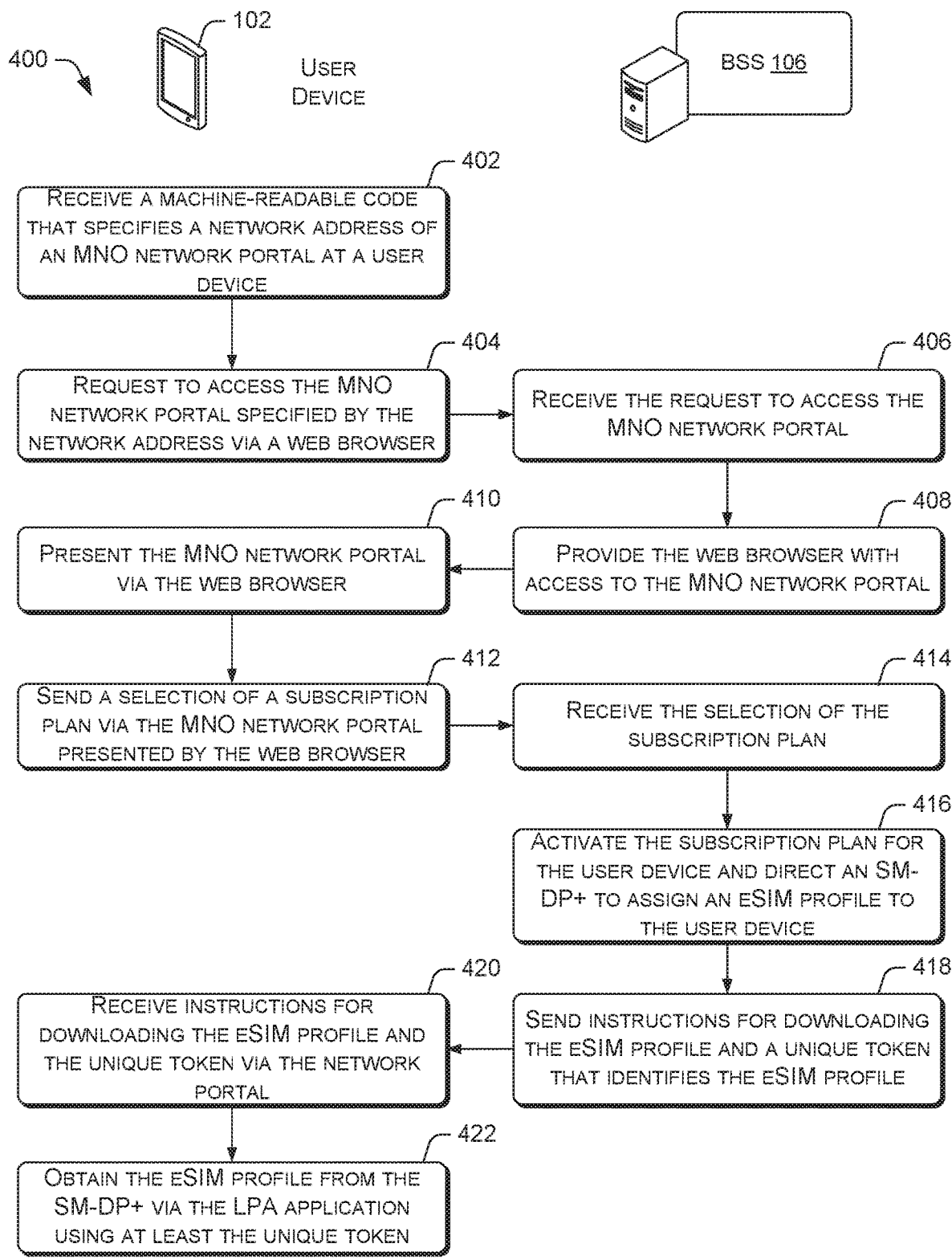
FIG. 4 is a flow diagram of an example process for using a machine-readable code that specifies a network address of an MNO network portal to activate the download of an eSIM profile to a user device.

FIG. 4 is a flow diagram of an example process 400 for using a machine-readable code that specifies a network address of an MNO network portal to activate the download of an eSIM profile to a user device. At block 402, the code reader application 120 on a user device 102 may receive a machine-readable code 118 that specifies the network address 114 of an MNO network portal 116 of the MNO 104. In various embodiments, the machine-readable code 118 may be a QR code, an Aztec code, a MaxiCode, or another type of machine-readable matrix code. At block 404, the code reader application 120 may use the web browser 122 to request access to the MNO network portal 116 specified by the network address 114. In various embodiments, network address 114 may be a URL, an IP address, or some other network location identifier. Accordingly, the web browser 122 may use the network address 114 to navigate to the MNO network portal 116.

At block 406, the BSS 106 of the MNO 104 may receive the request to access the MNO network portal 116. At block 408, the BSS 106 may provide the web browser 122 with access to the MNO network portal 116. At block 410, the web browser 122 may present the MNO network portal 116 via the web browser 122. In various embodiments, the MNO network portal 116 may be presented via one or more web pages. At block 412, the web browser 122 may send a selection of a subscription plan via the MNO network portal 116. In various embodiments, the user may use the one or more web pages to set up a subscriber account, select a particular subscription plan for the user device 102, customize a subscription duration for the subscription plan, sign up for optional features or offers associated with the subscription plan, configure payment options for the subscription plan, activate the subscription plan, and/or so forth.

At block 414, the BSS 106 may receive the selection of the subscription plan. At block 416, the BSS 106 may activate the subscription plan for the user device and direct the SM-DP+ 110 to assign an eSIM profile to the user device. At block 418, the BSS 106 may send instructions for downloading the eSIM profile and a unique token that identifies the eSIM profile to the user device 102 via the MNO network portal 116 presented by the web browser 122. In some embodiments, the instructions may include a network address of the SM-DP+ 110 along with directions for activating the LPA application 128 to download the eSIM profile from the SM-DP+ 110 using the unique token.

At block 420, the web browser 122 may receive the instructions for downloading the eSIM profile and the unique token via the MNO network portal. At block 422, the LPA application 128 on the user device 102 may obtain the eSIM profile from the SM-DP+ 110 using at least the unique token.

Figure 5:
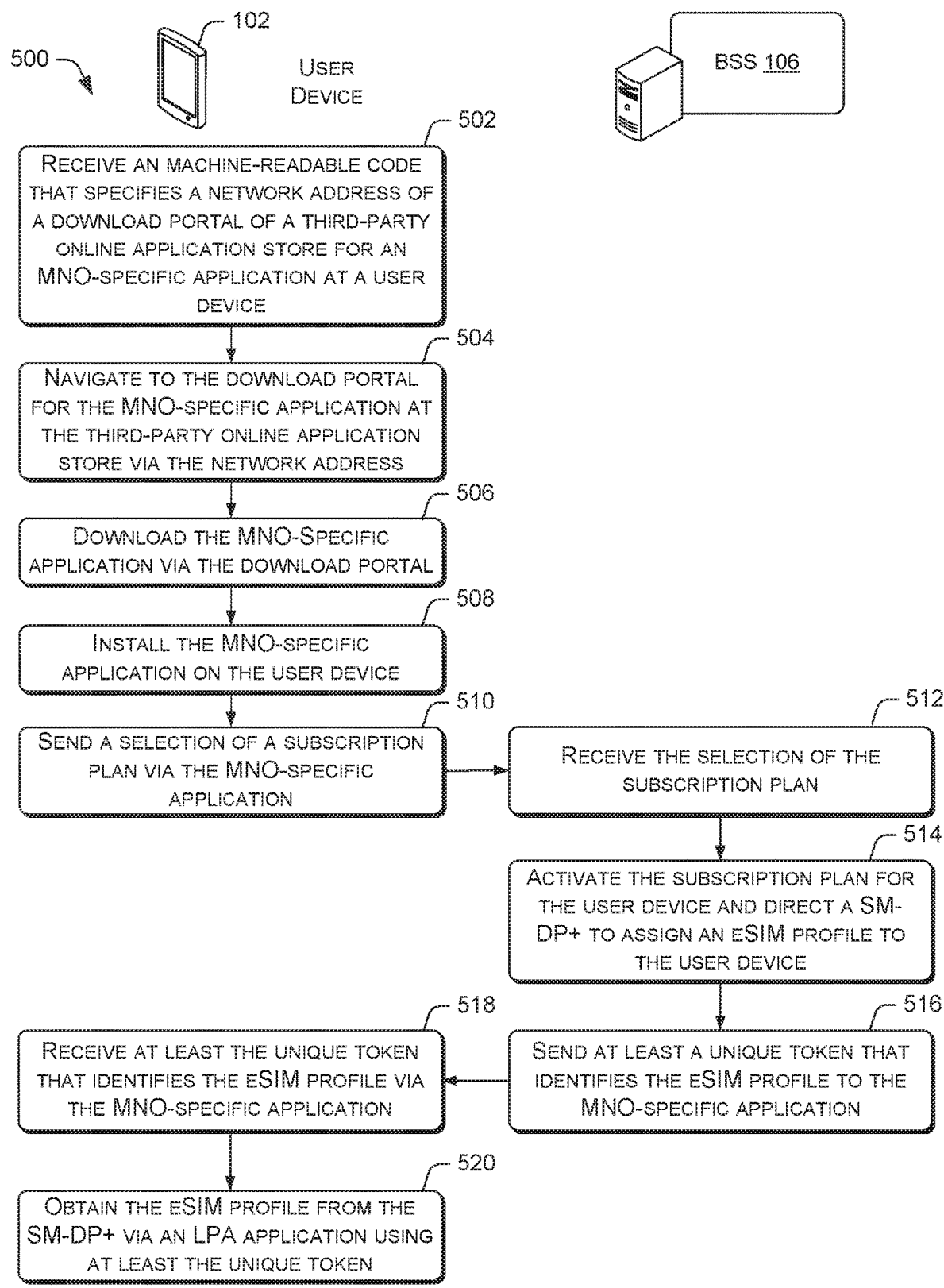
FIG. 5 is a flow diagram of an example process for using a machine-readable code that leads to an MNO-specific application to activate the download of an eSIM profile to a user device.

FIG. 5 is a flow diagram of an example process 500 for using a machine-readable code that leads to an MNO-specific application to activate the download of an eSIM profile to a user device. At block 502, the code reader application 120 on a user device 102 may receive the machine-readable code 140 that specifies the network address 132 of the download portal 134 of a third-party online application store 136 for the MNO-specific application 138. In various embodiments, the MNO-specific application 138 may be an application that is uploaded to the third-party online application store 136 by the MNO 104.

At block 504, the code reader application 120 may use the web browser 122 to navigate to the download portal 134 for the MNO-specific application 138 at the third-party online application store 136 via the network address 132. At block 506, the user device 102 may download the MNO-specific application 138 via the download portal 134. At block 508, the user device 102 may install the MNO-specific application 138 on the user device 102. At block 510, the MNO-specific application 138 may send a selection of a subscription plan to the BSS 106 of the MNO 104. For example, the user may use one or more interface screens of the MNO-specific application 138 to set up a subscriber account, select a particular subscription plan for the user device 102, customize a subscription duration for the subscription plan, sign up for optional features or offers associated with the subscription plan, configure payment options for the subscription plan, activate the subscription plan, and/or so forth.

At block 512, the BSS 106 may receive the selection of the subscription plan. At block 514, the BSS 106 may activate the subscription plan for the user device and direct the SM-DP+ 110 to assign an eSIM profile to the user device. At block 516, the BSS 106 may send at least a unique token that identifies the eSIM profile to the MNO-specific application 138. At block 518, the MNO-specific application 138 may receive at least the unique token that identifies the eSIM profile. In some embodiments, the unique token may be accompanied by information (e.g., instructions) that are provided by the BSS 106. The instructions may include a network address of the SM-DP+ 110 along with directions for activating the LPA application 128 to download the eSIM profile from the SM-DP+ 110 using the unique token. At block 520, the MNO-specific application 138 on the user device 102 may obtain the eSIM profile from the SM-DP+ 110 using at least the unique token and information received from the BSS 106 or pre-stored in the MNO-specific application 138.

Figure 6:
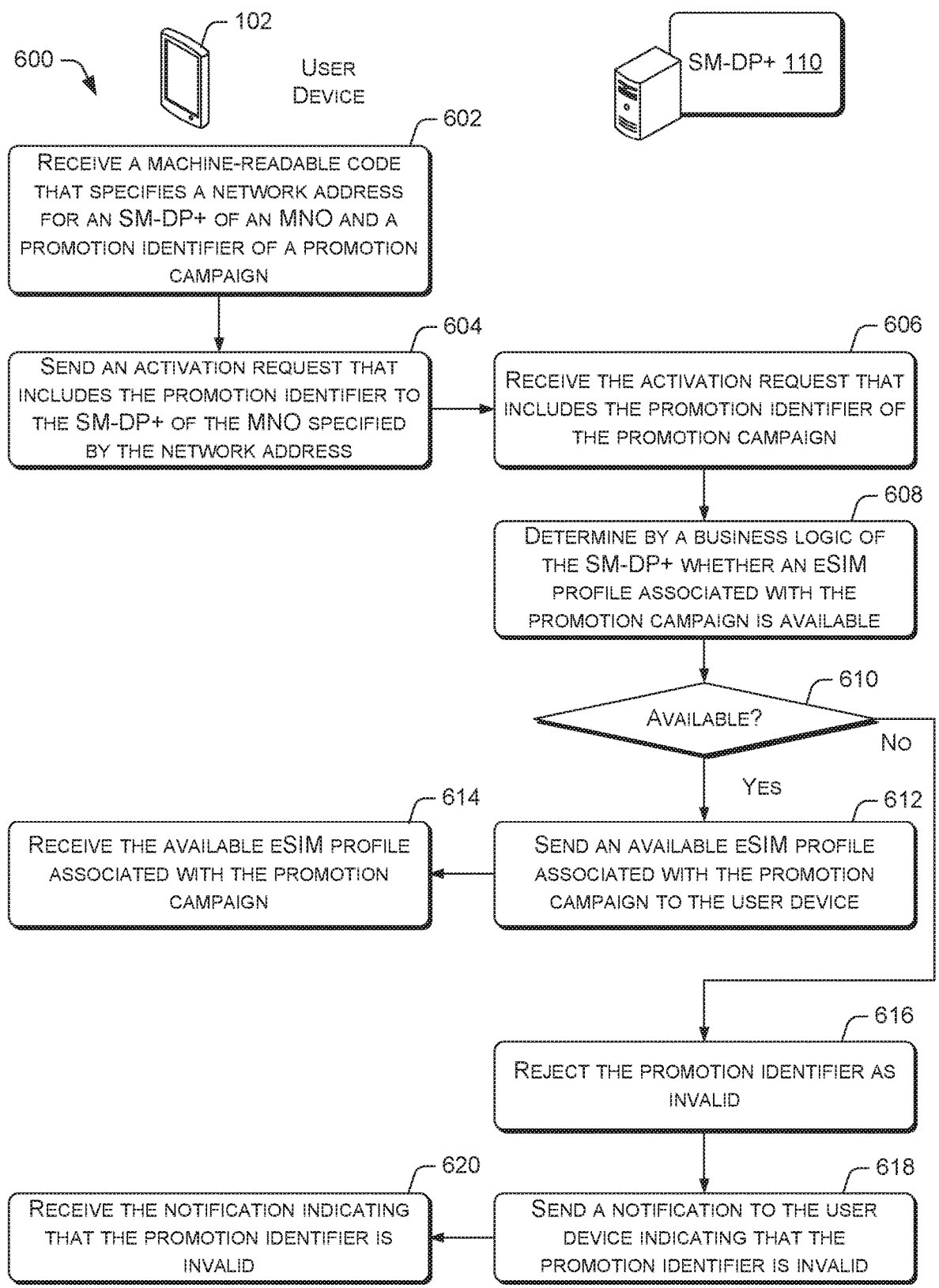
FIG. 6 is a flow diagram of a first example process for using a machine-readable code that specifies a network address of a Subscription Manager Data Preparation Plus (SM-DP+) to activate the download of an eSIM profile to a user device.

FIG. 6 is a flow diagram of a first example process 600 for using a machine-readable code that specifies a network address of an SM-DP+ to activate the download of an eSIM profile to a user device. At block 602, the code reader application 120 on a user device 102 may receive a machine-readable code 144 that specifies the network address 146 for the SM-DP+ 110 of the MNO 104 and a promotion identifier 150 of a promotion campaign. In various embodiments, the promotion campaign may be configured to promote a particular subscription plan offered by the MNO 104. For example, the particular subscription plan may be a trial subscription plan, a prepaid subscription plan, or a postpaid subscription plan. At block 604, the code reader application 120 may use the web browser 122 to send an activation request that includes the promotion identifier 150 to the SM-DP+ 110 specified by the network address 146.

At block 606, the SM-DP+ 110 may receive the activation request that includes the promotion identifier 150 of the promotion campaign. At block 608, a business logic of the SM-DP+ 110 may determine whether an eSIM profile associated with the promotion campaign is available. In various embodiments, the business logic may make this determination following a mutual authentication of the LPA application 128 and the SM-DP+ 110 to establish communication between the LPA application 128 and the SM-DP+ 110. The business logic module 216 may determine that the eSIM profile is unavailable for various reasons. For example, all eSIM profiles associated with the promotion campaign may have been distributed. In another example, the promotion campaign for distributing the eSIM profile may have expired. In an additional example, the eSIM profile may be determined to be unavailable when a user associated with the user device of the eSIM profile fails to meet any of the one or more subscriber requirements.

At decision block 610, if the business logic determines an eSIM profile associated with the promotion campaign is available, the process 600 may proceed to block 612. At block 612, the SM-DP+ may send an available eSIM associated with the promotion campaign to the LPA application 128 on the user device 102. At block 614, the LPA application 128 on the user device 102 may receive the available eSIM profile associated with the promotion campaign.

Returning to decision block 610, if the business logic determines that an eSIM profile associated with the promotion campaign is not available, the process 600 may proceed to block 616. At block 616, the SM-DP+ 110 may reject the promotion identifier as invalid. At block 618, the SM-DP+ 110 may send a notification to the user device 102 indicating that the promotion identifier is invalid. At block 620, the user device 102 may receive the notification that the promotion identifier is invalid and present the notification via the web browser 122.

Figure 7:
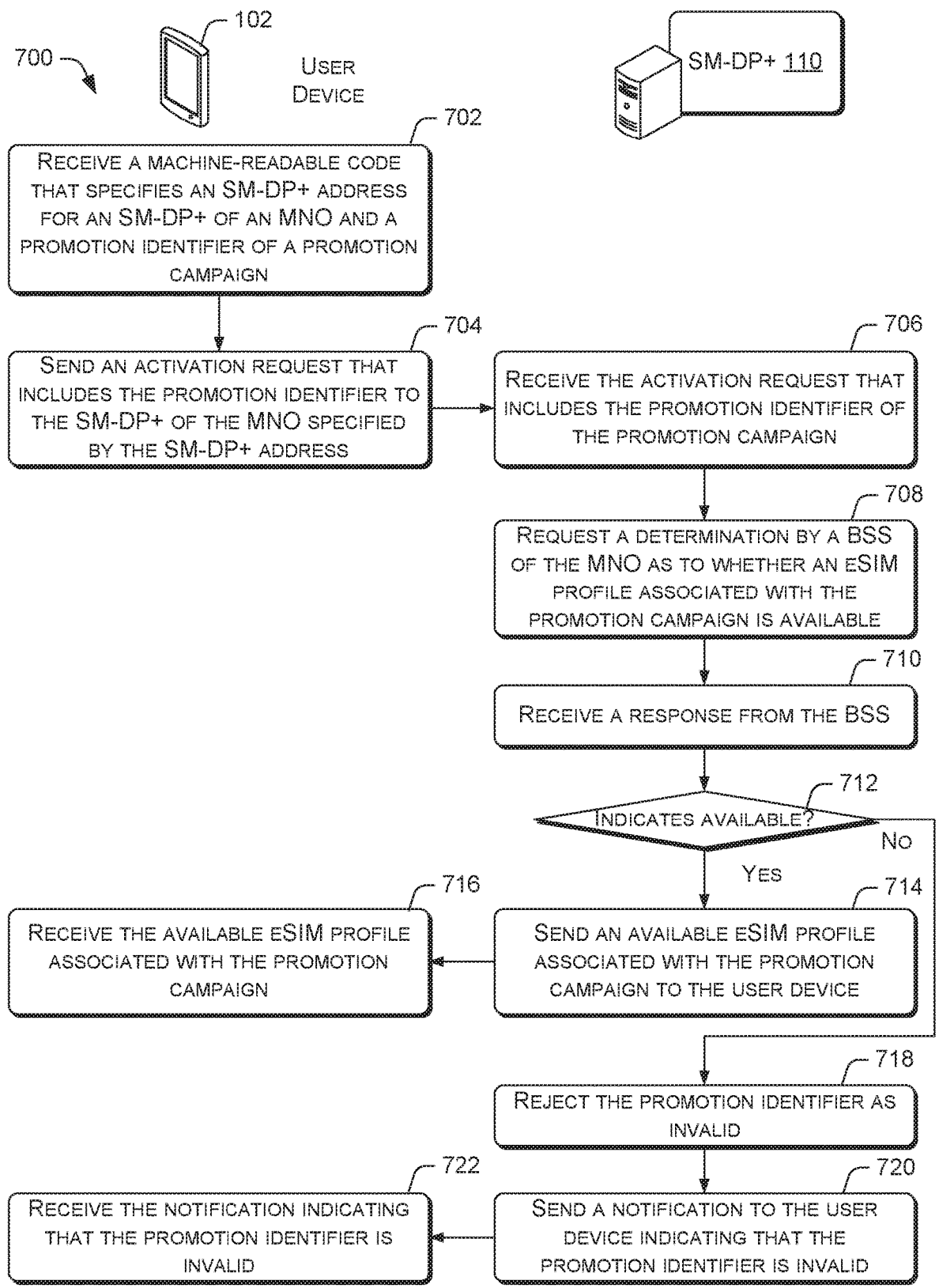
FIG. 7 is a flow diagram of a second example process for using a machine-readable code that specifies an SM-DP+ network address to activate the download of an eSIM profile to a user device.

FIG. 7 is a flow diagram of a second example process 700 for using a machine-readable code that specifies an SM-DP+ network address to activate the download of an eSIM profile to a user device. At block 702, the code reader application 120 on a user device 102 may receive a machine-readable code 144 that specifies the network address 146 for the SM-DP+ 110 of the MNO 104 and a promotion identifier 150 of a promotion campaign. In various embodiments, the promotion campaign may be configured to promote a particular subscription plan offered by the MNO 104. For example, the particular subscription plan may be a trial subscription plan, a prepaid subscription plan, or a postpaid subscription plan. At block 704, the code reader application 120 application may use the web browser 122 to send an activation request that includes the promotion identifier 150 to the SM-DP+ 100 specified by the network address 146.

At block 706, the SM-DP+ 110 may receive the activation request that includes the promotion identifier 150 of the promotion campaign. At block 708, the SM-DP+ 110 may request that a business logic of the BSS 106 make a determination of whether an eSIM profile associated with the promotion campaign is available. In various embodiments, the business logic may make this request following a mutual authentication of the LPA application 128 and the SM-DP+ 110 to establish communication between the LPA application 128 and the SM-DP+ 110. The business logic module 216 may determine that the eSIM profile is unavailable for various reasons. For example, all eSIM profiles associated with the promotion campaign may have been distributed. In another example, the promotion campaign for distributing the eSIM profile may have expired. In an additional example, the eSIM profile may be determined to be unavailable when a user associated with the user device of the eSIM profile fails to meet any of the one or more subscriber requirements.

At block 710, the SM-DP+ 110 may receive a response from the BSS 106. At decision block 712, if the response indicates that an eSIM profile associated with the promotion campaign is available, the process 700 may proceed to block 714. At block 714, the SM-DP+ may send an available eSIM associated with the promotion campaign to the LPA application 128 on the user device 102. At block 716, the LPA application 128 on the user device 102 may receive the available eSIM profile associated with the promotion campaign.

Returning to decision block 712, if the response indicates that an eSIM profile associated with the promotion campaign is not available, the process 700 may proceed to block 718. At block 718, the SM-DP+ 110 may reject the promotion identifier as invalid. At block 720, the SM-DP+ 110 may send a notification to the user device 102 indicating that the promotion identifier is invalid. At block 722, the user device 102 may receive the notification that the promotion identifier is invalid and present the notification via the web browser 122.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a server storing computer-executable instructions that upon execution cause one or more processors to perform acts comprising:
    receiving an activation request from a user device that includes a promotion identifier of a promotion campaign in which the promotion identifier is used by multiple user devices to obtain multiple embedded Subscriber Identity Module (eSIM) profiles from a pool of eSIM profiles, the promotion identifier being encapsulated by a machine-readable code that further includes a network address of the server, the activation request being routed from the user device to the server via the network address;
    determining whether an eSIM profile associated with the promotion campaign is available for download to the user device;
    in response to a determination that the eSIM profile is available, sending the eSIM profile associated with the promotion campaign to the user device such that the user device uses the eSIM profile to access telecommunication services of a Mobile Network Operator (MNO) according to one or more terms of the promotion campaign; and
    in response to a determination that the eSIM profile is unavailable, sending a response to the user device indicating that the promotion identifier is invalid.

2. The one or more non-transitory computer-readable media of claim 1, wherein the server executes a Subscription Manager Data Preparation Plus (SM-DP+).

3. The one or more non-transitory computer-readable media of claim 1, wherein the promotion identifier enables multiple downloads of a plurality of available eSIM profiles for the promotion campaign to multiple user devices.

4. The one or more non-transitory computer-readable media of claim 1, wherein the determining includes requesting a business support system (BSS) of a mobile network operator (MNO) to determine whether the eSIM profile associated with the promotion campaign is available for download to the user device.

5. The one or more non-transitory computer-readable media of claim 1, wherein the machine-readable code is a Quick Response (QR) code that is inputted into the user device via an image sensor that is activated by a QR reader application of the user device.

6. The one or more non-transitory computer-readable media of claim 5, wherein the activation request is transmitted by the QR reader application to the server.

7. The one or more non-transitory computer-readable media of claim 1, wherein the acts further comprise a local provisioning agent (LPA) application on the user device and the server performing a mutual authentication procedure to establish communication between the LPA application and the server.

8. The one or more non-transitory computer-readable media of claim 7, wherein the sending the eSIM profile includes sending the eSIM profile to the LPA application for the LPA application to store the eSIM profile in an embedded Universal Integrated Circuit Card (eUICC) of the user device.

9. The one or more non-transitory computer-readable media of claim 1, wherein the promotion campaign is a limited time duration promotion campaign, and the eSIM profile is determined to be unavailable for the user device when the limited time duration expires.

10. The one or more non-transitory computer-readable media of claim 1, wherein the promotion campaign includes a limited number of eSIM profiles for distribution to user devices, and the eSIM profile is determined to be unavailable for the user device when the limited number of eSIM profiles are distributed to other user devices.

11. The one or more non-transitory computer-readable media of claim 1, wherein the promotion campaign include an eligibility requirement, and the eSIM profile is determined to be unavailable for the user device when one or more subscriber details of a user associated with the user device indicate that the user fails to meet the eligibility requirement.

12. The one or more non-transitory computer-readable media of claim 1, wherein the promotion campaign includes a trial subscription plan, a prepaid subscription plan, or a postpaid subscription plan to the telecommunication services of the MNO.

13. The one or more non-transitory computer-readable media of claim 12, wherein the trial subscription plan to the telecommunication services of the MNO is available for a limited time period, and wherein access to the telecommunication services of the MNO via the eSIM profile is set to expire at an end of the limited time period.

14. A computer-implemented method, comprising:
receiving, at a Business Support System (BSS) of a Mobile Network Operator (MNO), a request from a user device to access an MNO network portal of the BSS, the requesting being routed from the user device to the BSS via a network address of the BSS that is encapsulated in a machine-readable code scanned by an image sensor of the user device;
providing, via the BSS, the user device with access to the MNO network portal in response to the request from the user device;
receiving, at the BSS, a selection of a subscription plan for using telecommunication services provided by the MNO through the MNO network portal;
activating the subscription plan for the user device and direct a Subscription Manager Data Preparation Plus (SM-DP+) to assign an embedded Subscriber Identity Module (eSIM) profile to the user device via the BSS; and
sending at least instructions for downloading the eSIM profile to the user device via the MNO network portal of the BSS to guide a user of the user device to download the eSIM profile to the user device.

15. The computer-implemented method of claim 14, wherein the sending includes sending a network address of the SM-DP+ and a unique token that is provided by the SM-DP+ to identify the eSIM profile to the user device such that a local provisioning agent (LPA) application on the user device uses the network address of the SM-DP+ to establish communication with the SM-DP+ and obtains the eSIM profile from the SM-DP+ using the unique token.

16. The computer-implemented method of claim 14, wherein the machine-readable code is a Quick Response (QR) code that is inputted into the user device via the image sensor as activated by a QR reader application of the user device.

17. The computer-implemented method of claim 14, wherein the providing the user device with access includes providing a web browser on the user device with access to one or more web pages of the MNO network portal.

18. A system, comprising:
one or more processors; and
memory including a plurality of computer-executable components that are executable by the one or more processors to perform a plurality of acts, the plurality of acts comprising:
receiving a request from a user device that includes a selection of a subscription plan for telecommunication services provided by a Mobile Network Operator (MNO), the selection including at least one of a subscription duration or a payment option configuration for the subscription plan, the requesting being routed from the user device to the system by an MNO-specific application of the MNO installed on the user device;
activating the subscription plan for the user device and direct a Subscription Manager Data Preparation Plus (SM-DP+) to assign an embedded Subscriber Identity Module (eSIM) profile to the user device; and
sending at least a unique token that is provided by the SM-DP+ for identifying the eSIM profile to the MNO-specific application on the user device such that a local provisioning agent (LPA) application on the user device receives the unique token and obtains the eSIM profile from the SM-DP+ using the unique token,
wherein the MNO-specific application is downloaded to the user device from a download portal of a third-party online application store identified by a network address, the network address being encapsulated in a machine-readable code scanned by an image sensor of the user device.

19. The system of claim 18, wherein the sending includes sending a network address of the SM-DP+ and a unique token that is provided by the SM-DP+ to identify the eSIM profile to the user device such that the LPA application on the user device receives the network address and the unique token, uses the network address of the SM-DP+ to establish communication with the SM-DP+, and obtains the eSIM profile from the SM-DP+ using the unique token.

20. The system of claim 18, wherein the machine-readable code is a Quick Response (QR) code that is inputted into the user device via the image sensor as activated by a QR reader application of the user device.

* * * * *